July 3, 1928.
J. BENZ
1,676,175
CENTERING DEVICE FOR USE IN MACHINING
CRANKSHAFTS, ECCENTRICS, OR THE LIKE
Filed Dec. 31, 1927  2 Sheets-Sheet 1
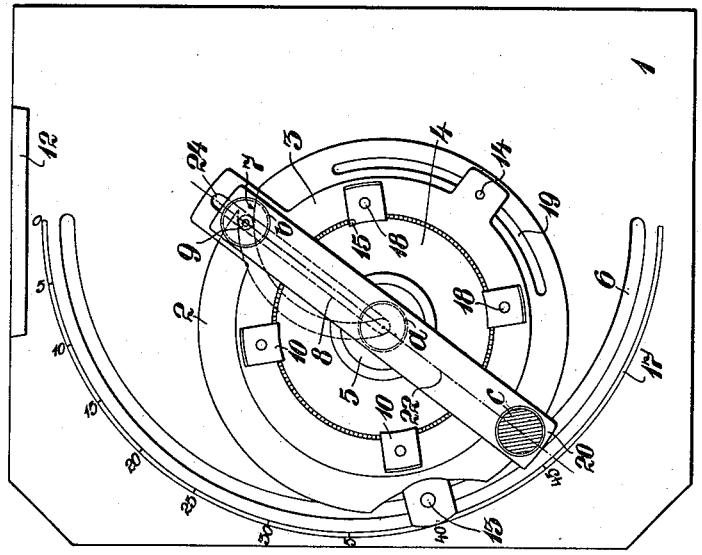
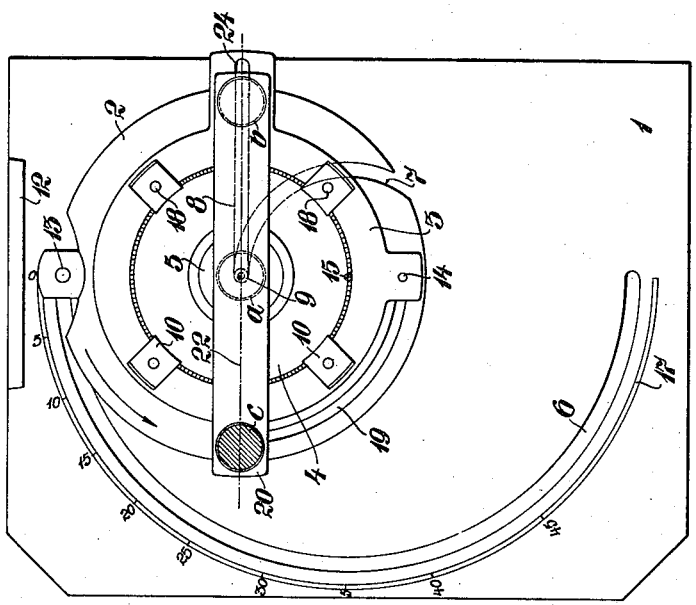
J. Benz
INVENTOR
By Marks & Clerk
Attys.

July 3, 1928.
J. BENZ
1,676,175
CENTERING DEVICE FOR USE IN MACHINING
CRANKSHAFTS, ECCENTRICS, OR THE LIKE
Filed Dec. 31, 1927
2 Sheets-Sheet 2

J. Benz
INVENTOR
By: Marks & Clerk
ATT'YS

Patented July 3, 1928.

1,676,175

UNITED STATES PATENT OFFICE.

JOHANNES BENZ, OF DUSSELDORF, GERMANY.

CENTERING DEVICE FOR USE IN MACHINING CRANK SHAFTS, ECCENTRICS, OR THE LIKE.

Application filed December 31, 1927, Serial No. 243,897, and in Germany May 30, 1925.

The invention relates to a centering device for use in machining crankshafts, eccentrics or the like, in which an auxiliary faceplate (provided with clamping means for the work) serves to bring the relatively offset crankpins successively into position for machining, that is to say into the working axis of the lathe, grinder or other machine employed.

Said auxiliary faceplate is mounted on a rockable carrier, the angular throw of which is made to correspond to the length of the crank web whereon the crankpin to be machined is situated. In the zero position of the rockable carrier, the journal axis of the crankshaft coincides, for example in the case of a lathe, with the axis of the lathe spindle. When a crankpin on the shaft is to be machined, the carrier for the auxiliary faceplate is first swung through a certain angle corresponding to the length of the web of the crank, the angle through which it must be turned being read off on a scale on which the various lengths of crank are marked. After this swinging movement, the axis of the crankpin to be machined does not coincide, as it ought to do, with the working or spindle axis of the lathe, but must then be brought into agreement therewith by turning back the auxiliary faceplate about its own axis.

An object of the invention is to bring about this agreement automatically.

To the attainment of this object the auxiliary faceplate is so guided for movement relatively to the rockable carrier as to ensure it being positively and automatically turned, during the outward swing of the carrier, to such an extent that the axis of the crankpin and the lathe or other machine will coincide.

The arrangement is or may be such that during swinging movement of the rockable carrier, a selected radius on the auxiliary faceplate continuously intersects a fixed centre line normal thereto, that is the working axis of the machine when the device is in use. From this it follows that if a crankshaft, for example, be initially centered and set on the auxiliary faceplate with a crank radius coincident with the selected radius aforesaid, each and every crankpin on the same crank radius (even though these be cranks of different lengths) can be centered for machining by simply swinging out the rockable carrier to the required extent.

Preferably the work is secured by the aid of a second auxiliary faceplate, with a chuck or equivalent, co-axially mounted for rotation on the first auxiliary faceplate and adapted to be clamped thereto. This not only facilitates the correct initial setting of the work but, when a crankpin has been centered for machining by swinging out the rockable carrier, it enables relatively offset crankpins to be centered successively without unclamping the work itself. Moreover, if the relatively offset crankpins have the same length, the setting of the rockable carrier and first auxiliary faceplate need not be disturbed.

The foregoing and other features of the invention hereinafter claimed can best be described with reference to the accompanying drawings whereon two constructional forms of the device are illustrated by way of example.

Figs. 1 and 2 are similar diagrammatic views of the first of these forms showing the rockable carrier in the zero position and in an outwardly swung position respectively.

Figs. 3 and 4 are corresponding views of the second illustrated form of the device.

Figure 4:
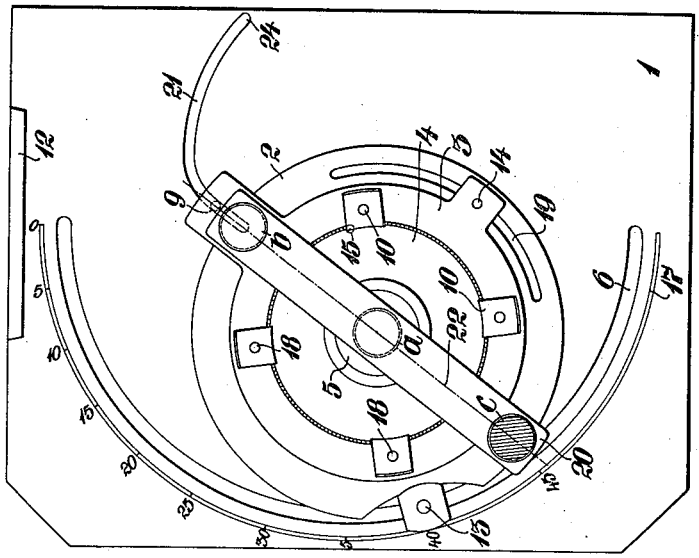
Figure 5:
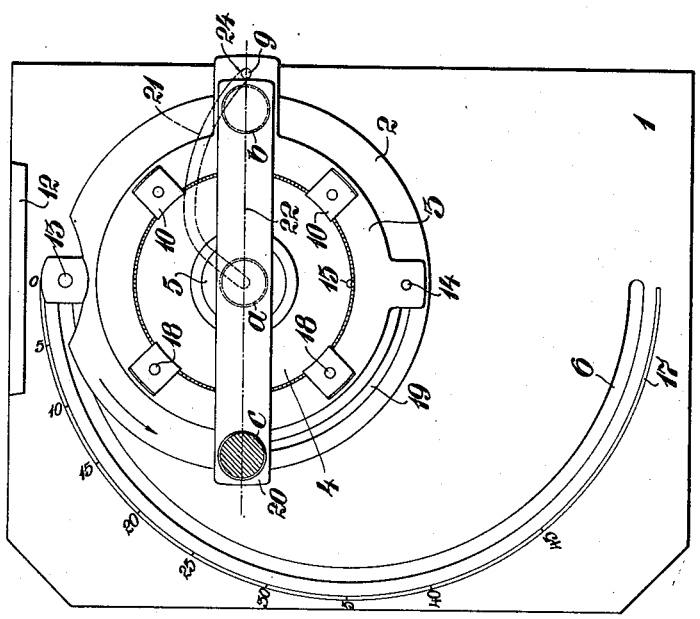

Referring first more particularly to Figs. 1 and 2, it will be seen that there is mounted on the faceplate of the lathe or other machine a faceplate 1 on which a carrier 2 is adapted to swing or rock about a bolt 15. Mounted on the carrier are two auxiliary faceplates 3 and 4 whose common axis coincides, in the zero position of the carrier (Fig. 1), with the axis of the lathe spindle. The auxiliary faceplate 4, to which the work is directly attached by means of a chuck 5 thereon, is rotatably and co-axially mounted on the other auxiliary faceplate 3, which in turn is rotatably mounted on the rockable carrier 2. The plate 1 carries a pin (or it may be a roller) 9, which is co-axial with the lathe spindle and serves inter alia to secure the auxiliary faceplate 3 and the carrier 2 to the plate 1. Additional means for fixing the carrier 2 consist of a screw 13, which is adapted to slide in an arcuate slot 6, and of the aforesaid bolt 15. A scale 17 for setting the length of the crank webs is marked along the arcuate slot 6 of which the bolt 15 forms the centre. This scale does not indicate the angle through which the carrier 2 is to be swung, but denotes at once the lengths of crank web corresponding to the various angular positions. The fixing of the auxiliary faceplate 3 in relation to the carrier 2 is effected by means of a screw pin 14 engaging a slot 19 in the carrier. As will be seen, the pin 9 projects through an arcuate slot 7 in the carrier 2 of which slot the bolt 15 forms the centre; said pin 9 also projects through a radial slot 8 in the second plate 3.

The auxiliary faceplate 4 (which, as already stated, is rotatably mounted on the other 3) is adapted to be secured to the auxiliary faceplate 3 by clamps 10 and screws 18.

The method of operating is as follows:—

With the carirer 2 in position on the point O of the scale 17, as shown in Fig. 1, the longitudinal slot 8 in the auxiliary faceplate 3 is brought to lie parallel with a setting-out ledge 12 on the plate 1. In this position the crankshaft 20, which is to be machined and which is mounted, at both ends, centrically, with the crankshaft middle journal $a$, is also secured, parallel with the ledge 12, in the chuck 5 of the auxiliary faceplate 4. Then, after loosening the fastenings 13, 14, 15 and 9 of the carrier 2 and the auxiliary faceplate 3, the carrier is swung by hand on the pivot 15, in the direction of the arrow, until it reaches the point on the scale 17 (Fig. 2) corresponding to the desired length of the crank. In the example shown, the length of the crank is 40 millimetres. During this movement and by reason of the engagement between the radial slot 8 of the plate 3 and the pin or roller 9 situated in the axis of the lathe, said plate 3 is turned about its axis, but, of course, in the opposite direction to the rotational movement of the carrier. In this procedure the crank central line 22 throughout its entire length between the journal $a$ and crankpin $b$ continuously intersects the axis of the pin or roller 9 and therefore the axis of the lathe spindle. Since the line 22 connecting the centres of the crankshaft journal and pins $a:b:c$ coincides completely with the centre of the longitudinal slot 8, the requisite movement of the crankpin $b$ into the axis of the lathe spindle is effected automatically and simultaneously with the swinging stroke of the carrier.

By tightening up the fastenings 13, 14, 15 and 9, the crankshaft, which is gripped firmly by the chuck 5, is rigidly connected with the plate 1, the carrier 2 and the auxiliary faceplate 3, and the adjusted crankpin $b$ (Fig. 2) can now be machined without more ado.

To bring the other crankpin $c$ into the axis of the lathe spindle, all that is necessary, after loosening the clamps 10, is to turn the auxiliary faceplate 4 about its own axis through the required angle (180° for oppositely disposed crankpins).

During all these operations, the crankshaft 20 remains fixed in the chuck 5, and is not disengaged until all the work to be done is completed.

By turning the carrier 2 back into its original or zero position, the middle pins or journals of the crankshaft are brought to lie centrically, so that the pin or journal $a$ again lies in the axis of the lathe spindle.

Obviously, the pin or roller 9 may be replaced by a small pinion, and the longitudinal slot 8 by a rack, an arrangement which is of advantage, in machining heavier weights which have to be swung, in order to facilitate the adjustment of the throw and enable the frictional resistance to be overcome.

In the described operation of adjusting the throw, the outwardly directed end 24 of the radial slot 8 describes a definite curve 21 (Figs. 3 and 4) which can be plotted and the centre line of which exactly intersects the axis of the lathe spindle. It therefore follows that the same result (continuous leading of the connecting line 22 between the pins $a$—$b$ through the axis of the lathe spindle) can be ensured by the aid of such a curve 21 (either projecting or recessed) on the plate 1 and engaged by a roller 9 disposed on the auxiliary faceplate 3, as shown in Figs. 3 and 4. The relation in this case is naturally inverted. Whereas in the first described construction the positive guidance of the centre line 22 through the axis of the lathe spindle generates a curve as stated, in the second construction, the externally effected rotational movement of the auxiliary faceplate 3 in accordance with the previously prescribed curve, causes the line 22 connecting the crankshaft pins between $a$—$b$, to be guided exactly through the axis of the lathe spindle.

In the construction according to Figs. 3 and 4, the roller 9 may be replaced by a small pinion, and the curved slot or curve by a correspondingly shaped toothed quadrant, with equally good results. Moreover, both the guiding means 8:9 (Figs. 1 and 2) and the guiding means 9:21 (Figs. 3 and 4) for ensuring the automatic turning back of the auxiliary faceplate 3 may be employed together in the same device.

I claim:

1. A centering device for use in machining crankshafts, eccentrics and the like on lathes, grinders and other machines, comprising a faceplate adapted to be mounted in the machine, a rockable carrier pivoted on the faceplate, an auxiliary faceplate rotatable on the rockable carrier about an axis other than the pivotal axis of the latter, means for centering and clamping the work on the auxiliary faceplate, and means whereby swinging movement imparted to the rockable carrier simultaneously and automatically turns the auxiliary faceplate about its own axis so that a predetermined radius continuously intersects the axis of the machine.

2. A centering device for use in machining crank-shafts, eccentrics and the like on lathes, grinders and other machines, comprising a faceplate adapted to be mounted in the machine, a rockable carrier pivoted on the faceplate, an auxiliary faceplate rotatable on the rockable carrier about an axis other than the pivotal axis of the latter, a second auxiliary faceplate co-axially mounted with the first, means for centering and clamping the work on the second auxiliary faceplate, means for detachably clamping both auxiliary faceplates together, and means whereby swinging movement imparted to the rockable carrier automatically turns the first auxiliary faceplate about its own axis so that a selected radius of said faceplate continuously intersects a fixed centre line normal thereto which fixed center line is the axis of the machine.

3. A centering device for use in machining crankshafts, eccentrics and the like on lathes, grinders and other machines, comprising a faceplate adapted to be mounted in the machine, a rockable carrier pivoted on the faceplate, an auxiliary faceplate rotatable on the rockable carrier about an axis other than the pivotal axis of the latter, means for centering and clamping the work on the auxiliary faceplate, means whereby swinging movement imparted to the rockable carrier automatically turns the auxiliary faceplate about its own axis so that a selected radius of said auxiliary faceplate continuously intersects a fixed centre line normal to the faceplate which fixed center line is the axis of the machine, and means to register the swinging movement of the rockable carrier in terms of lengths of crank.

4. A centering device for use in machining crankshafts, eccentrics and the like on lathes, grinders and other machines, comprising a faceplate adapted to be mounted in the machine, a rockable carrier pivoted on the faceplate, an auxiliary faceplate rotatable on the rockable carrier about an axis other than the pivotal axis of the latter, a second auxiliary faceplate co-axially mounted with the first, means for centering and clamping the work on the second auxiliary faceplate, means for detachably clamping both auxiliary faceplates together, means whereby swinging movement imparted to the rockable carrier simultaneously and automatically turns the first auxiliary faceplate about its own axis so that a predetermined radius continuously intersects the axis of the machine, and means to register the swinging movement of the rockable carrier in terms of lengths of crank.

5. A centering device for use in machining crankshafts, eccentrics and the like on lathes, grinders and other machines, comprising a faceplate adapted to be mounted in the machine, a rockable carrier pivoted on the faceplate, an auxiliary faceplate rotatable on the rockable carrier about an axis other than the pivotal axis of the latter, means for centering and clamping the work on the auxiliary faceplate, means on the faceplate to facilitate initial setting of the work and auxiliary faceplate, and means whereby swinging movement imparted to the rockable carrier automatically turns the auxiliary faceplate about its own axis so that a selected radius of said auxiliary faceplate continuously intersects a fixed centre line normal thereto which fixed center line is the axis of the machine.

6. A centering device for use in machining crankshafts, eccentrics and the like on lathes, grinders and other machines, comprising a faceplate adapted to be rotated in the machine, a rockable carrier eccentrically mounted on the faceplate, an auxiliary faceplate rotatable on the rockable carrier about an axis which can be made to coincide with the axis of rotation of the faceplate, a second auxiliary faceplate co-axially mounted with the first, means for centering and clamping the work on the second auxiliary faceplate, means for detachably clamping both auxiliary faceplates together and to the rockable carrier, means on the faceplate to facilitate initial setting of the work and auxiliary faceplates, and means whereby swinging movement imparted to the rockable carrier simultaneously and automatically turns the first auxiliary faceplate about its own axis so that a predetermined radius continuously intersects the axis of the machine, and in a direction opposed to said swinging movement.

7. A centering device for use in machining crankshafts, eccentrics and the like on lathes, grinders and other machines, comprising a faceplate adapted to be rotated in the machine, a rockable carrier eccentrically mounted on the faceplate, an auxiliary faceplate rotatable on the rockable carrier about an axis which can be made to coincide with the axis of rotation of the faceplate, a second auxiliary faceplate co-axially mounted with the first, means for centering and clamping the work on the second auxiliary faceplate, means for detachably clamping both auxiliary faceplates together and to the rockable carrier, means on the faceplate to facilitate initial setting of the work and auxiliary faceplates, and means whereby swinging movement imparted to the rockable carrier automatically turns the first auxiliary faceplate about its own axis so that a selected radius of said auxiliary faceplate continuously intersects the axis of rotation of the first mentioned faceplate.

8. A centering device for use in machining crankshafts, eccentrics and the like on lathes, grinders and other machines, comprising a faceplate adapted to be mounted in the machine, a rockable carrier pivoted on the faceplate, an arcuate slot in the faceplate graduated in terms of lengths of crank, means on the rockable carrier engaging the slot, an auxiliary faceplate rotatable on the rockable carrier about an axis other than the pivotal axis of the latter, means for centering and clamping the work on the auxiliary faceplate, and means whereby swinging movement imparted to the rockable carrier simultaneously and automatically turns the auxiliary faceplate about its own axis so that a predetermined radius continuously intersects the axis of the machine and in a direction opposed to said swinging movement.

9. A centering device for use in machining crankshafts, eccentrics and the like on lathes, grinders and other machines, comprising a faceplate adapted to be mounted in the machine, a rockable carrier pivoted on the faceplate, an auxiliary faceplate rotatable on the rockable carrier about an axis other than the pivotal axis of the latter, an arcuate slot in the faceplate graduated in terms of lengths of crank, means on the rockable carrier engaging the slot, means for centering and clamping the work on the auxiliary faceplate, and means whereby swinging movement imparted to the rockable carrier automatically turns the auxiliary faceplate about its own axis so that a selected radius of said auxiliary faceplate continuously intersects a fixed centre line normal thereto which fixed center line is the axis of the machine.

10. A centering device for use in machining crankshafts, eccentrics and the like on lathes, grinders and other machines, comprising a faceplate adapted to be rotated in the machine, a rockable carrier eccentrically mounted on the faceplate, an arcuate slot in the faceplate graduated in terms of lengths of crank, means on the rockable carrier engaging the slot, an auxiliary faceplate rotatable on the rockable carrier about an axis which can be made to coincide with the axis of rotation of the faceplate, a second auxiliary faceplate co-axially mounted with the first, a chuck for centering and clamping the work on the second auxiliary faceplate, means for detachably clamping both auxiliary faceplates together and to the rockable carrier, and means whereby swinging movement imparted to the rockable carrier automatically turns the first auxiliary faceplate about its own axis so that a selected radius of said auxiliary faceplate continuously intersects the axis of rotation of the main faceplate.

In testimony whereof I affix my signature.

JOHANNES BENZ.